(12) United States Patent
Magdelyns et al.

(10) Patent No.: US 6,234,208 B1
(45) Date of Patent: *May 22, 2001

(54) SHUT-OFF DEVICE

(75) Inventors: Michel Magdelyns, Brussels; Rufino Perez, St Pieters Leeuw, both of (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,176

(22) Filed: Dec. 6, 1999

Related U.S. Application Data

(63) Continuation-in-part of application No. 09/058,239, filed on Apr. 10, 1998, now Pat. No. 6,003,554.

(51) Int. Cl.⁷ ...................................................... F16K 1/22
(52) U.S. Cl. ...................................... 137/630.14; 123/337
(58) Field of Search ........................ 123/337; 137/630.14

(56) References Cited

U.S. PATENT DOCUMENTS

| | | | |
|---|---|---|---|
| 2,796,082 | 6/1957 | Green et al. | 137/630.15 |
| 3,620,195 | * 11/1971 | Lamm | 123/337 X |
| 3,804,124 | 4/1974 | Finke et al. | 137/630.14 |
| 3,971,414 | 7/1976 | Illing | 137/630.15 |
| 4,408,581 | 10/1983 | Pfalzgraf et al. | 123/337 |
| 5,220,944 | 6/1993 | Burnett et al. | 137/630.14 |
| 5,333,838 | 8/1994 | Garcia-Mallol | 251/305 |
| 6,003,554 | * 12/1999 | Magdelyns et al. | 137/630.14 |

FOREIGN PATENT DOCUMENTS

| | | |
|---|---|---|
| 2950866 | 6/1981 | (DE) . |
| 0050707 | 5/1982 | (EP) . |
| 2254931 | 1/1992 | (GB) . |

* cited by examiner

*Primary Examiner*—Gerald A. Michalsky
(74) *Attorney, Agent, or Firm*—Venable; Marina V. Schneller; Catherine M. Voorhees

(57) ABSTRACT

A shut-off device for progressive regulation of the flow rate of a fluid flowing in a pipe includes a main shut-off member which is able to pivot independently about a spindle passing through the pipe in order to close the latter, and at least one drive flap able to pivot about the spindle and act mechanically on the main shut-off member in such a way as to turn it about the spindle. The main shut-off member also being traversed by at least one orifice that can be closed by at least one shut-off flap, which flap can also pivot about the spindle, is integral with the drive flap and can regulate the rate of flow of the fluid through the orifice. The main shut-off member only begins to pivot about the spindle, from an initial closed position, when the drive flap is at a predetermined non-zero angular distance φ from the said member, thus allowing the fluid to flow only through the orifice until the main shut-off member begins to open.

13 Claims, 5 Drawing Sheets

SHUT-OFF DEVICE

CROSS-REFERENCE TO RELATED APPLICATIONS

This application is a continuation-in-part of U.S. application Ser. No. 09/058,239, filed Apr. 10, 1998, now U.S. Pat. No. 6,003,554, the subject matter of which is incorporated herein by reference.

BACKGROUND OF THE INVENTION

The present invention relates to a shut-off device with progressive opening that can be used in particular in a throttle valve to regulate the rate of flow of air to an internal-combustion engine and thus to determined the power it develops, by the movement of a part—typically in the form of a disc—that can pivot about one of its diameters perpendicular to the axis of the pipe in which it is fitted.

In many cases, and in particular in the throttle valve mentioned above, it is important to be able to regulate the rate of flow of a fluid in as progressive a manner as possible, especially at low flow rates. However, in the case of low-viscosity of fluids such as air, most shut-off devices have a virtually "all-or-nothing" action, or at any rate are incapable of precise and progressive regulation of low flow rates.

In addition to a satisfactorily progressive control of flow rate, it is beneficial for such shut-off devices to have at least some measure of adaptability, in order that one device can display different flow characteristics and can thus be used in different contexts (to allow it to be fitted, say, to engines of different horsepower), with the least possible adaptation work. In other words it is desirable that the majority of the components of the device be common to its different applications, and that any parts specific to each of these applications be as few and as inexpensive as possible.

Most known throttle valves are made of metal, for example aluminum, so that the tolerances—and consequently the flow characteristic—are not excessively affected by the large temperature variations to which such a device can be subject, especially in a vehicle, and are also reasonably identical from one specimen to the next. The use of metal is an expensive solution; it would be preferable to find a solution permitting the use of plastic materials, which would also offer a reduction in the weight of the device.

Proposed solutions have already been put forward to solve these problems. For example, document GB 2,254,931 proposes the use of a plastic shut-off member of complicated shape (FIG. 8) comprising in particular a profiled lip (145) to reduce the flow rate when the angle of opening is small. It goes without saying that the production of such a device is complex and demands great precision. This usually means using high-performance—and therefore high-cost—plastic materials, or the use of machining. In addition, the device cannot be adapted easily to different types of engines without machining or replacing the shut-off member. Another problem with the device disclosed in this document is that the profiled lip running all the way around the periphery of the shut-off member, and therefore across the full width of the pipe, creates a significant loss of pressure when the shut-off member is fully open. The device is also characterized by an extremely complicated and bulky bypass idle system.

Another proposal for achieving progressive control of low flow rates involves giving the inside surface of the section of pipe in which the shut-off member is installed an approximately spherical shape so that when the shut-off member pivots open, the distance separating its edge from the wall (and therefore the flow rate of the fluid) initially rises very progressively in a predetermined manner. This proposal, however, makes the pipe section difficult to fabricate, owing among other things to its undercuts. Moreover, the precision with which the inside surface of the pipe must be profiled makes the use of plastic materials inappropriate.

SUMMARY OF THE INVENTION

The present invention seeks to overcome these problems and to provide a shut-off device that is simple to produce, requires no great dimensional accuracy and gives good progressive regulation at low flow rates. When the device is fitted to an internal-combustion engine, more specific objectives relate to easy control of idle (with possible incorporation of a bypass function), and easy adaptation of the device to different use environments. This is useful for, for example, adapting a given engine to allow it to be installed in vehicles with or without an air conditioning system, and/or with or without an automatic gearbox. The invention also seeks to provide a shut-off device, which functions well even if made of plastic. The device of the invention must also have the lowest possible loss of pressure when open.

For this purpose the invention relates to a shut-off device for progressive regulation of the flow rate of a fluid flowing in a pipe, comprising
  (a) a main shut-off member able to pivot independently about a spindle passing through the pipe and close the latter, and
  (b) at least one drive flap able to pivot about the spindle and act mechanically on the main shut-off member in such a way as to turn it about the spindle; the main shut-off member also being traversed by at least one orifice that can be closed by at least one shut-off flap, which flap can also pivot about the spindle, is integral with the drive flap and can regulate the rate of flow of the fluid through the orifice; the main shut-off member only beginning to pivot about the spindle, from an initial closed position, when the drive flap is at a predetermined non-zero angular distance $\phi$ from the member, thus allowing the fluid to flow only through the orifice until the main shut-off member begins to open.

This device fulfils the objectives described above.

The pipe may be of any shape. It is advantageously of a circular section to reduce the perimeter of the main shut-off member and hence the risk of leakage in the closed position.

DETAILED DESCRIPTION OF THE INVENTION

Figure 1:
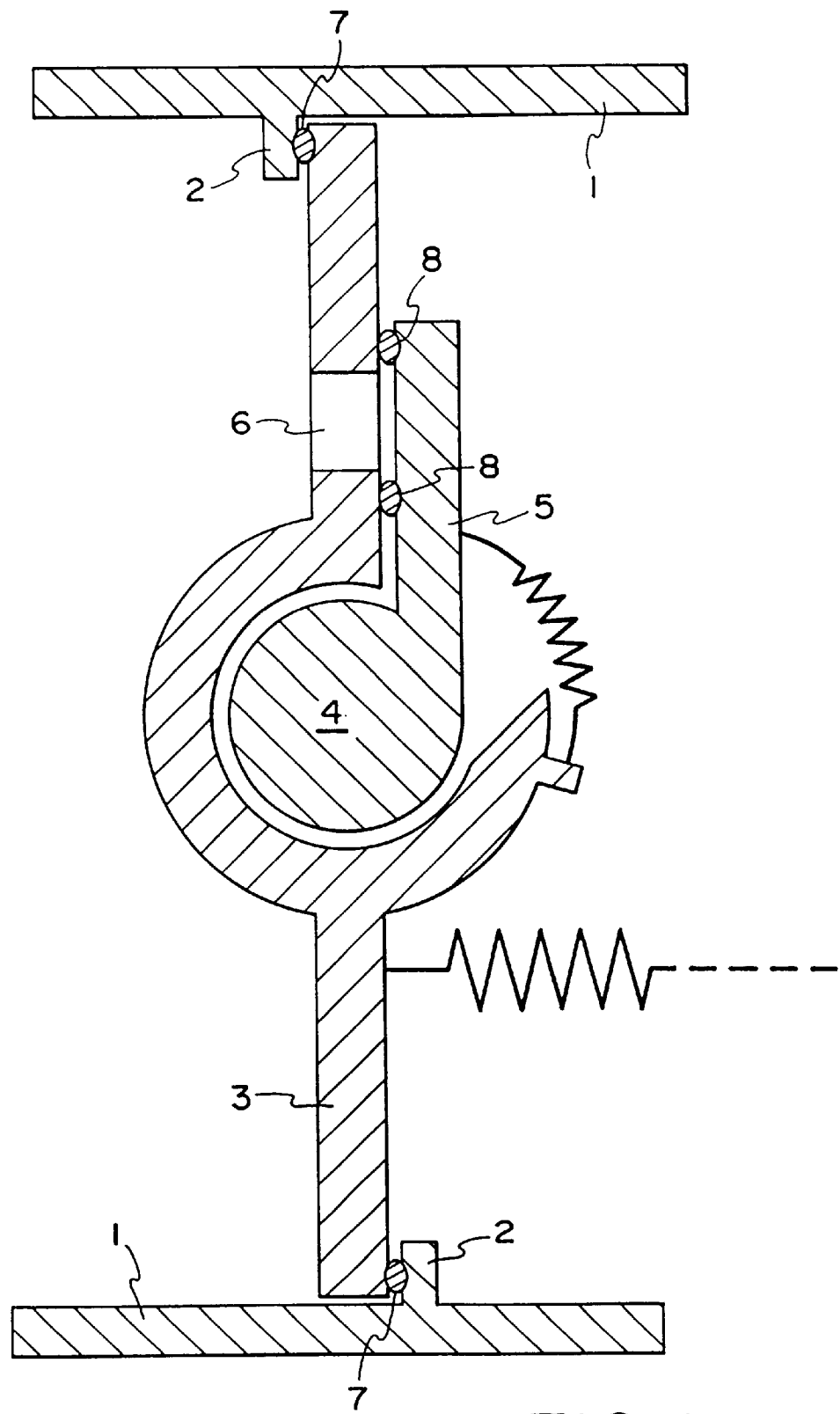
FIG. 1 is a sectional view of a shut-off device according to the invention in the closed position.

The main shut-off member (hereinafter "MSOM" for simplicity) is often made of an approximately flat plate corresponding in shape to the cross-section of the pipe to enable it to close it completely, and may be ribbed to improve its stiffness. When the pipe is of a circular section, the member is in the form of a disc. This member can pivot about a spindle that passes through the pipe perpendicularly to the pipe axis. The MSOM may or may not be integral with the spindle. If it is so integral, neither the shut-off flap nor the drive flap can be integral with the spindle, as the MSOM must be capable of pivoting independently of the flap(s). In an advantageous variant, the MSOM is, however, not integral with this spindle, and for simplicity's sake the rest of this description relates specifically to this variant, although this option is not limiting. In this variant, the MSOM comprises guide means such as, for example a hollow cylindrical housing situated generally in its own plane, through which the spindle passes. The MSOM may also, for the same purpose, have fixing lugs consisting, for example, of U-shaped snap-locking parts. However, care must be taken to ensure that the play between the spindle and the MSOM is sufficient to allow it to rotate without excessive friction. One of more bearings may advantageously be used to reduce friction between the spindle and the MSOM.

In order to improve the leak tightness of the device in the closed position, the pipe is advantageously provided with internal shoulders in the approximate shape of semicircles, against which the edge of the MSOM can abut; this variant reduces the importance of the accuracy of the dimensions (and expansion of the MSOM on the leakage rate in the closed position. In order to reduce or eliminate the risk of leakage, these shoulders may advantageously be provided with seals on the face that comes into contact with the closed MSOM. Alternatively, seals may be provided on the MSOM itself around the periphery of its lateral faces. Having these seals in this position, rather than on the narrow edge face of the MSOM or in a groove in the wall of the pipe means that the seals are not subjected to sideways forces, which can lead to problems of wear or sticking or even actual unseating of the seals.

Advantageously, the main shut-off member has return means in order that, in the absence of any stress, this member shuts and closes off the pipe. These return means may comprise, for example, one or more springs, and may be arranged equally satisfactorily in the pipe as outside it. In the latter case, transmission means are therefore necessary between the interior and exterior of the pipe, making the use of seals necessary (unless magnetic transmission means are used). One advantage of the presence of these return means is that it prevents the engine from racing by automatically closing the pipe if the external signal (control) is accidentally interrupted. A second advantage is that these return means ensure that the flow characteristic—i.e., the equation relating the rate of flow of the fluid in the pipe to an external control signal such as an angle of opening—suffers no hysteresis on account of the presence of flap(s), since such return means prevent the MSOM from being opened when it orifice is closed by the shut-off flap.

Alternatively, these return means may be included in a special design of MSOM. For example, if the spindle is not central relative to the MSOM the fluid will exert a different force on the two parts of the MSOM either side of the spindle, resulting in a return torque causing the MSOM to turn.

It will be realized that the invention also extends to variants equivalent to that described above. For example, the spindle around which the MSOM can pivot need not necessarily extend from one side of the MSOM to the other but may also be two short rods, each lying in the axis of the other, passing through the wall of the pipe at two diametrically opposite points and being housed in two recesses of limited depth formed either side of the MSOM. Alternatively, one of these two rods may optionally take the form of a protuberance forming an integral part of the MSOM, in which case the pipe will have a depression for housing this protuberance.

The MSOM comprises at least one small orifice. The combination of this or these orifice(s) with at least one shut-off flap as described below constitutes an essential feature of the invention, since it is only through this or these orifice(s) that the fluid flows, under the control of one or more shut-off flaps, when the shut-off device is set for a low flow rate.

The generally small width of the flap(s) ensures that they cause minimal loss of pressure when the MSOM is open.

For simplicity's sake, the present disclosure will refer to one flap and one orifice, it being understood that the indications given can apply to each of the flaps and/or to each of the orifices where more than one flap and/or more than one orifice are used.

The number of shut-off flaps is not necessarily equal to the number of orifices. For example, one shut-off flap may close a number of orifices.

The shut-off flap and the drive flap are not necessarily separate. Where they are separate, or more generally where several flaps are used, these flaps are all joined together, and therefore move as one. In order to join them together, they may, for example, be fixed to the spindle, provided the MSOM can pivot independently of the spindle. The variant in which the device comprises a single flap serving as both the shut-off flap and the drive flap is particularly advantageous because of its simplicity.

The shut-off flap has slightly larger dimensions than the orifice. The function of this flap is to control the flow rate of the fluid: the object is to achieve complete closure of the orifice in the MSOM when the flow rate required through the shut-off device is zero, and to give progressive variation of this flow rate, through the orifice only, within the range of low flow rates, when the MSOM is closed.

To create a good seal in the closed position, the shape of the shut-off flap is adapted to that of the corresponding orifice, or adapted more precisely to the shape of that part of the surface of the MSOM that lies in front of the flap and with which the flap comes into contact when closed. Preferably, the main shut-off member and the shut-off flap are basically planar. The shut-off flap and/or the periphery of the orifice formed in the MSOM are advantageously also fitted with a seal such as a toroidal O-ring.

The fact that the variation in the flow rate (at low values) depends in large part on the precise shape of the shut-off flap is an advantage because one MSOM can thus be used in shut-off devices intended for different uses (e.g., engines of different horsepower), provided there are shut-off flaps specifically adapted to each of these uses.

In one advantageous variant, in order to give a progressive variation in the flow rate through the orifice while the MSOM is still in the closed position, at least one shut-off flap not only has an essentially planar region (or at any rate one adapted in shape to that of the part of the surface of the MSOM where the orifice is situated), but also has a protuberance that is essentially perpendicular to the flap (to this planar region), the protuberance being directed towards the orifice and able to engage in the latter. The protuberance is preferably profiled in such a way that the available cross-section through which the flow rate can travel through the orifice varies in a highly progressive way when the angular distance of the flap from the MSOM is small. The protuberance may be integral with the shut-off flap, or may be a separate part fixed to the flap itself by ordinary means (such as welding, snap fastening or screwing). One advantage of using a removable protuberance is that the same shut-off flap can easily be fitted with different protuberances, thus adapting the shut-off device in a simple way to different uses. The protuberance may be in a variety of different forms. For example, it may be a sort of cone, possibly slightly deformed to an arc of a circle to optimize its centering relative to the orifice (horn-like protuberance). If the MSOM has two orifices, each with a shut-off flap fitted with a protuberance to close it, there is no reason why the two protuberances should be identical. A different variation in the rate of flow of fluid through each orifice can thus be obtained. In addition, whatever the design of the flaps, the orifices themselves can, if desired, be of different dimensions and/or shapes.

The shut-off flap may also be in the form of a trapezoidal or triangular tongue designed to progressively enter an orifice in the form of a slot of equal width. In another variant, the shut-off flap is flexible and comes into contact with the MSOM over a variable portion of its surface: in other words, beginning with a situation of complete closure, the flap first passes through a situation in which it is partly off the MSOM, before ceasing to have any contact with the MSOM.

Lastly, another method by which the flow characteristic of the device can be adapted to a specific application involves machining the MSOM appropriately. This machining may be very limited. Thus, if it is desired to have two types of MSOM available, one with an orifice of small diameter (D1) and the other with an orifice of larger diameter (D2), the MSOMs can all be made with an orifice of diameter D1, with subsequent machining of some of them to increase the diameter of their orifice to the value D2. Alternatively, the machining can also be used to achieve accurately a predetermined flow characteristic within the range of the low flow rates (where the MSOM itself remains closed), by installing the shut-off devices one by one in a measuring machine equipped with a fluid source and flow-rate sensors, and if necessary, lightly machining the orifice as dictated by the results of these measurements. If the MSOM is made of plastic, such machining can be done easily, for example by means of a laser.

The function of the drive flap is mechanical, and consists in opening the MSOM once the flap has reached a predetermined angular distance. Expressed in another way, the position of the MSOM is determined by that of the drive flap.

One important feature of the device of the invention is that, in order for it to be able precisely and progressively to regulate a small fluid flow rate, the drive and shut-off flap(s) must be capable of separating angularly from the MSOM without moving it. On the other hand, beyond a certain predetermined angular distance ($\phi$), the drive flap must drive the member and open it. In other words, using $\alpha$ and $\beta$ to denote the angular distance of the drive flap and of the MSOM, respectively, from their initial common position of closure, the following succession of situations is passed through from zero flow rate to maximum flow rate. The angular distance between the drive flap and the MSOM is therefore $\alpha-\beta$; the predetermined maximum value of this distance, defined by construction, is denoted $\phi$. The angle $\phi$ is advantageously between 5 and 20°. Since the drive flap and the shut-off flap are integral, the angular distance between the shut-off flap and the MSMOM will also be $\alpha-\beta$.

| Flap | MSOM | Situation |
| --- | --- | --- |
| $\alpha + 0$ | $\beta = 0$ | Complete closure (zero fluid flow rate) |
| $\alpha = \phi/2$ | $\beta = 0$ | The shut-off flap is partly open; the MSOM is closed; a small flow passes through the orifice of the member |
| $\alpha = \phi$ | $\beta = 0$ | The shut-off flap is at maximum opening; the MSOM is still closed; a larger flow passes through the orifice |
| $\alpha = 3\phi/2$ | $\beta = \phi/2$ | The shut-off flap is at maximum opening; the MSOM has been partly opened by the drive flap and the fluid flow rate is therefore higher |
|  | $\beta \approx 90°$ | The MSOM is completely open and flow rate is maximum |

One advantageous embodiment of a device that works in this way is described below. In this embodiment, the main shut-off member comprises a transverse hollow cylindrical housing for the spindle, which housing comprises, at at least one end, an opening in the form of a slot, parallel to the spindle, through which the drive flap passes, which opening intercepts, in a plane perpendicular to the spindle, an angle allowing the flap to pivot through a maximum angle $\phi$ relative to the main shut-off member. This single flap here acts as both a shut-off flap and a drive flap. The hollow cylindrical housing is situated approximately in the plane of the MSOM and in its middle, in order that the fluid cannot exert any torque on the MSOM (for simplicity's sake the MSOM is treated as if it were planar, even though this is not strictly the case in the mathematical sense of the term). Thus, in the case of a disc-shaped MSOM, this housing is approximately along a diameter of the MSOM. The length of the slotted opening (measured parallel to the spindle) is slightly greater than the width of the flap. In the circumferential direction, that is when taking a cross-section perpendicular to the axis, this opening usually extends from one face of the MSOM and intersects an angle corresponding to the maximum angular distance ($\phi$) allowable between the flap and the MSOM. The flap may be made integral with the spindle, for example by forming a flat on the latter or by using a single injection-molded part acting as both the spindle and the flap. In this way, by inserting the spindle with its fitted flap into the hollow cylinder of the MSOM, and locating this assembly inside the pipe, in such a way that one end of the spindle is accessible and can be controlled from outside the pipe, it is possible to produce a shut-off device that operates as described in the above table.

In an advantageous variant, the hollow cylindrical housing has an opening in the form of a slot at each of its two ends, and a drive flap passes through each of the two openings. This gives a drive flap close to each of the two ends of the spindle: consequently the MSOM is loaded symmetrically by the drive valves and is not in torsion, as would be the case if a single drive flap were arranged close to a single edge of the MSOM. At least one of these two drive flaps must also serve simultaneously as the shut-off flap in order to close an orifice in the MSOM. In a very simple variant, the MSOM contains, close to one of its edges, a single orifice with a shut-off flap that also acts as a drive flap, while a separate drive flap is arranged close to the other edge of the MSOM so that this member is not subjected to torsion. Assembling the shut-off device in this case is very simple, being simply a matter of selecting a suitable shut-off flap and drive flap for the intended application and fixing them at each end of the spindle, which will have been previously fed through the hollow cylinder of the MSOM serving as the spindle housing, each flap taking its place in the slot made for it at each end of the said cylinder where it can pivot through a limited angle (φ).

If desired, the two drive flaps may also each act as shut-off flaps, the MSOM having two corresponding orifices.

Other embodiments are not ruled out. For example, the hollow cylindrical housing of the MSOM may contain a single slotted opening extending from one edge of the MSOM to the other. In this form, one way of correctly positioning the flap or flaps would be to provide a flap of a carefully chosen length at one or both ends of the spindle.

Figure 5:
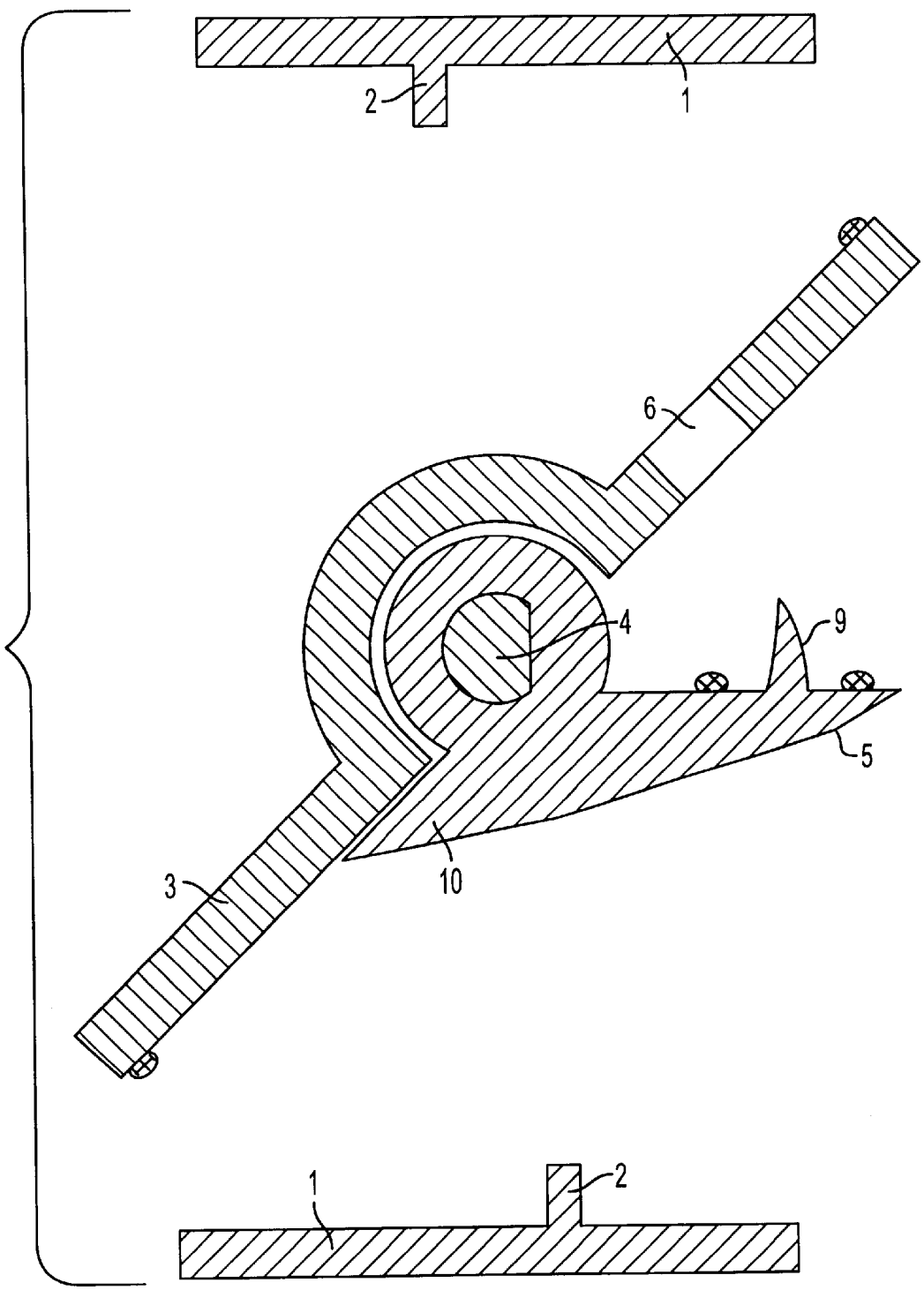
FIG. 5 is similar to FIG. 2 with a modified drive flap.

Alternatively, if the MSOM is provided with fixing lugs (U-shaped, for example) to hold the spindle while allowing it to turn independently, the MSOM may, as an alternative to the above, be fitted with an angular abutment consisting, for example, of a curved protuberance fixed to the MSOM level with the drive flap, on the opposite side of the spindle from the orifice, permitting the MSOM to be driven by the drive flap when the latter has reached a predetermined angular distance (φ) relative to the MSOM as shown in FIG. 5.

In order for the device of the invention to be controlled so as to give the desired flow rate, the drive flap must be connected to transmission means by which it can be made to move from the outside of the pipe. As mentioned previously, if two or more flaps are present, all are integral with each other and therefore move together. A simple solution is for the flap or flaps to be fixed to the spindle and for at least one end of the spindle to pass out through the pipe wall where it can be rotated. It is desirable in this case to use one or more appropriate seals to minimize—and if possible, eliminate—leaks between the inside and outside of the pipe, as well as between the upstream and downstream parts of the pipe. The transmission means can then be connected to a suitable actuator. In the context of engines, the device will be described as a "mechanical throttle valve" when connected to a lever or pedal operated by the user via transmission means such as a cable or rod, and as a "motorized throttle valve" when the device is connected to an electrical, pneumatic or hydraulic actuator, this actuator being generally controlled by a computer which monitors various different parameters of engine performance, as well as, of course, user control signals.

In certain particular cases, such as when the device of the invention is to be used in a throttle valve designed for regulating the air flow to the internal-combustion engine of a vehicle, it is advantageous for return means to keep the shut-off flap separated from the main shut-off member in the absence of an external load. The advantage of this is that should the mechanical means (actuators) controlling the opening of the device fail, the shut-off flap will stay open, supplying the engine with an amount of air which is small, but greater than the flow rate corresponding to idle running, which will allow the vehicle to be driven to, say, a garage (the "limp-home" function). These return means may consist of one or more springs, for example. They may connect the shut-off flap to the MSOM directly or indirectly (e.g., by connecting the MSOM to the spindle if the flap is fixed to it).

The adaptability of the device of the invention makes it easy to set the "limp-home" flow rate at a level suitable for the nature of the vehicle (with or without air conditioning, automatic gearbox, etc.), and thus provide an acceptable limp-home speed despite a possible extra load on the engine.

In an advantageous variant, the device of the invention is made of plastic, at least as regards its main parts forming the main shut-off member, the section of pipe in which this member is fitted, and the flap or flaps. These various parts may, if desired, be made from different plastics. The spindle itself may optionally be metallic. One advantage of the invention is that its flow characteristic is relatively insensitive to its expansion, and it is this that permits the use of plastics. The term "plastic" here is intended to signify any polymer or mixture of polymers possibly containing one or more additives (antioxidants, stabilizers, pigments, etc.) and possible one or more fillers (calcium carbonate, glass fibres, etc.). The plastic employed need not necessarily be an "engineering polymer" with high mechanical properties, such as a poly(phenylene) sulphide, a polyarylamide or a polyetherimide; on the contrary, "ordinary" plastic materials such as polymides can be used with advantage. It is preferable to use a polymide 6 or 6,6 filled with inorganic fillers.

As initially described, the device of the invention is advantageously used in combination with an internal-combustion engine. It is typically used as a "throttle valve" situated on the engine air supply pipe, generally between an air filter and an inlet manifold distributing the air to the different cylinders. In most vehicles, the opening of the device, and therefore the air flow rate, are controlled by an accelerator pedal, either directly (cp. "mechanical throttle valve") or indirectly (cp. motorized throttle valve). To this end the invention also relates to a throttle valve for an internal-combustion engine, comprising a shut-off device as described above. It also relates to an internal-combustion engine fitted with such a throttle valve; in particular a petrol engine.

In the case of a mechanical throttle valve, it is generally useful to employ an adjustable so-called "idling" bypass to provide the engine with a quantity of air sufficient to prevent it cutting out even when the actual shut-off device is completely closed. This bypass may take the form of a tube connecting two points of the pipe situated upstream and downstream of the said device, this tube preferably comprising means for regulating the idling flow passing through it.

In the case of a motorized throttle valve, one of the advantages of the device of the invention is that there is no need for such an external bypass, a bypass function being obtainable very simply, in the device of the invention by keeping the shut-off flap open to a certain minimum extend which is permanently and automatically adapted to the engine running conditions (load, temperature, etc.) so as to ensure a predetermined minimum turning speed.

The device of the invention can also be used in any other application where precise control of the rate of flow of a fluid is required, whether the fluid is gas or liquid.

The appended figures illustrate, in a non-restrictive way, different variants of the device of the invention.

FIG. 1 shows a section through a shut-off device in accordance with the invention. The axis of the pipe is parallel to the plane of the figure, which is perpendicular to the spindle. Visible in this figure are the walls of the pipe (1), with shoulders (2) approximately in the form of semicircles, designed to improve the seal when the valve is closed. The main shut-off member (3) is shown in the closed position; it contains a through orifice (6) and a hollow cylindrical housing passing across its diameter and containing the spindle (4). The spindle is fitted with a flap (5) that acts as a both shut-off flap and drive flap, shown here in the closed position. The periphery of the MSOM (3) is fitted with two seals (7) in the form of semicircles designed to act on the shoulders (2), and the flap (5) is fitted with a toroidal O-ring seal (8).

Figure 2:
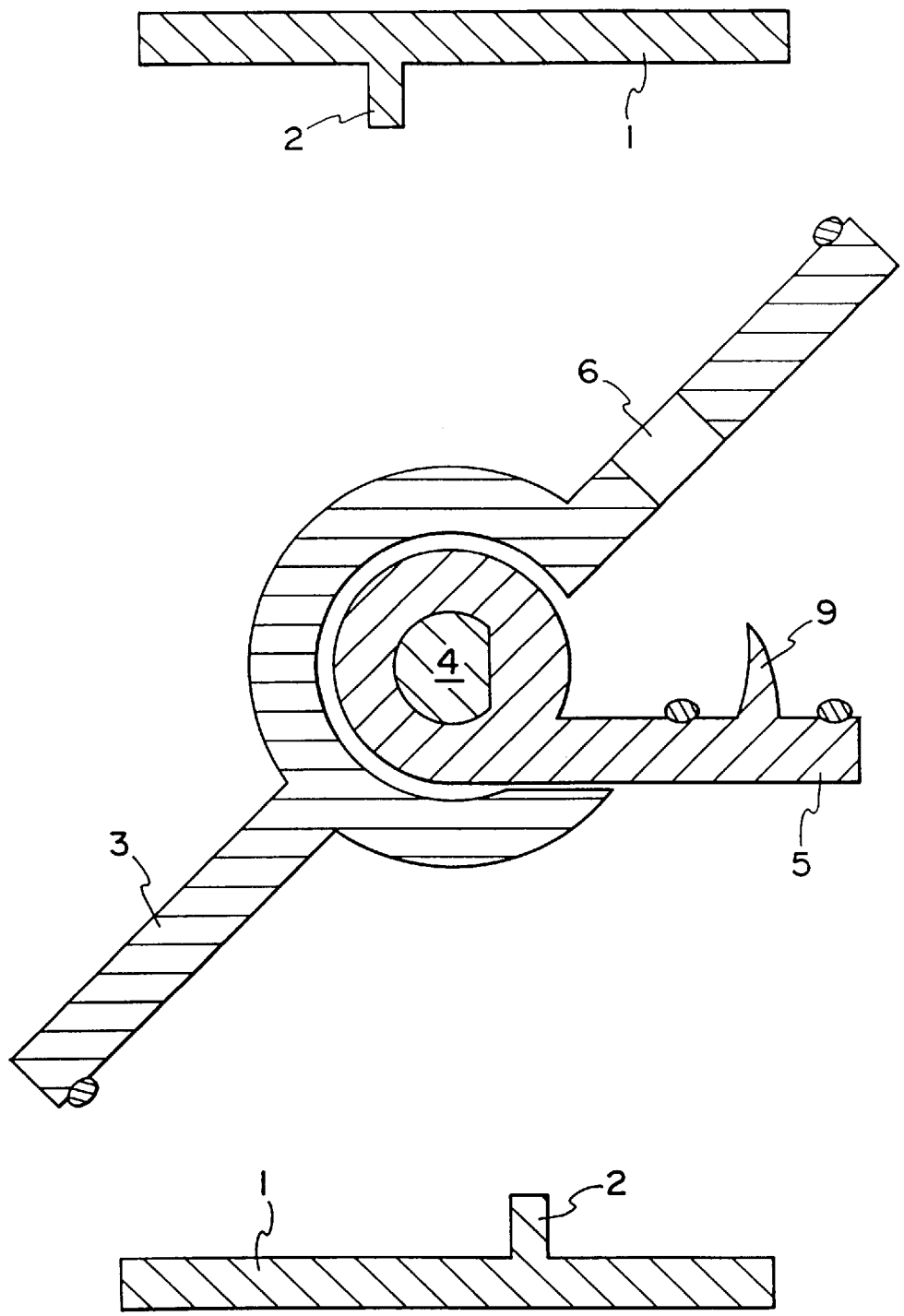
FIG. 2 is a sectional view of another shut-off device according to the invention in the open position.

FIG. 2 shows a similar device in the open position: the flap (5) is at maximum opening and has caused partial opening of the MSOM (3). One difference between the device shown in FIG. 2 and that in FIG. 1 is that the flap (5) of FIG. 2 carries a protuberance (9) approximately perpendicular to the planar part of the flap (5), and so shaped as to be engageable in the orifice (6) in such a way as to improve the progressive control over the fluid flow through the orifice (6) within the range of low flow rates. Also shown in FIG. 2 is a spindle (4) with a flat used for the angular fixing of the flap to the spindle.

Figure 3:
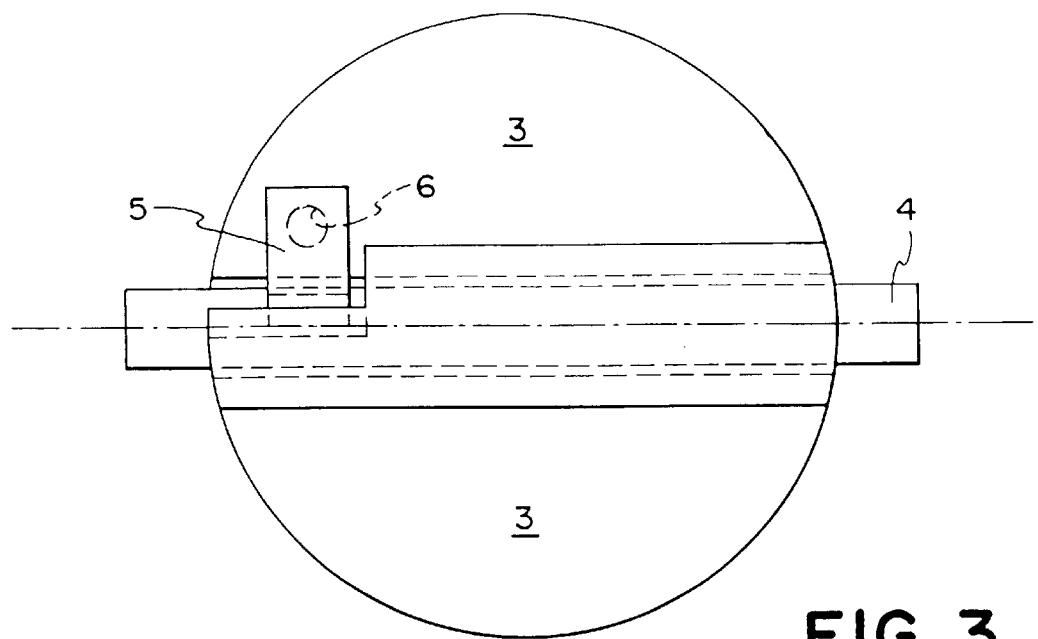
FIG. 3 is an elevational view of a shut-off device according to the invention.

FIG. 3 shows the same device in elevation. For simplicity, the pipe wall has not been shown. It will be understood that at least one end of the spindle (4) passes through the pipe wall to allow it to be connected to an appropriate actuator so that the flap—and indirectly the MSOM—can be placed in the desired position.

Figure 4:
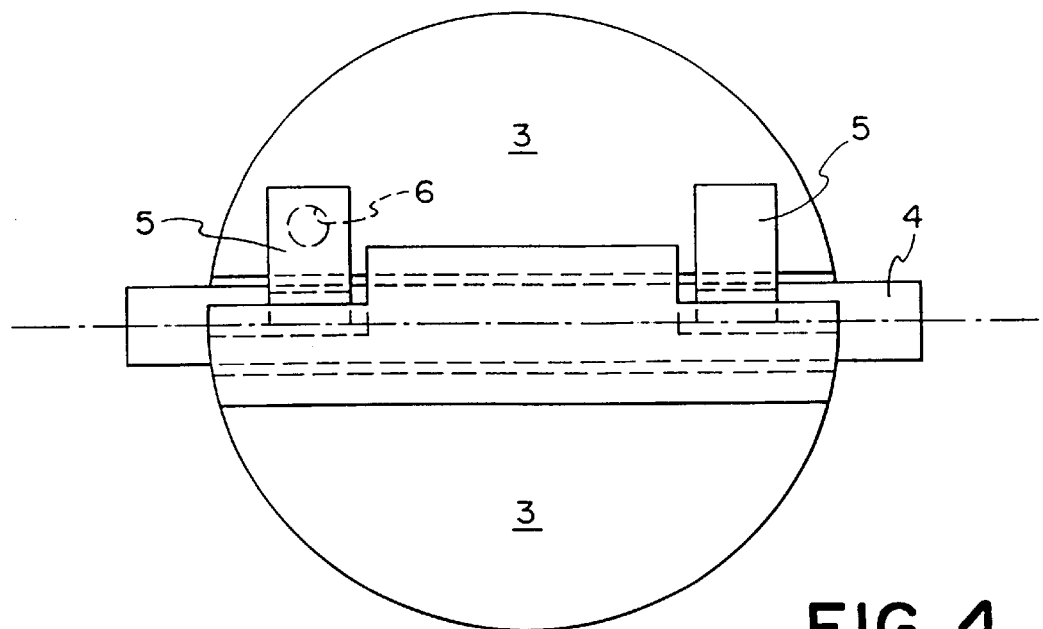
FIG. 4 is similar to FIG. 3, but shows a shut-off device according to the invention with two flaps (5)

FIG. 4 is similar to FIG. 3, but shows a shut-off device according to the invention with two flaps (5).

As shown in FIG. 5, the MSOM may be fitted with an angular abutment (10) which is fixed to the MSOM level with the drive flap (5), on the opposite side of the spindle (4) from the orifice (6). This arrangement permits the MSOM to be driven by the drive flap (5) when the latter has reached a predetermined angular distance (φ) relative to the MSOM.

Figure 6:
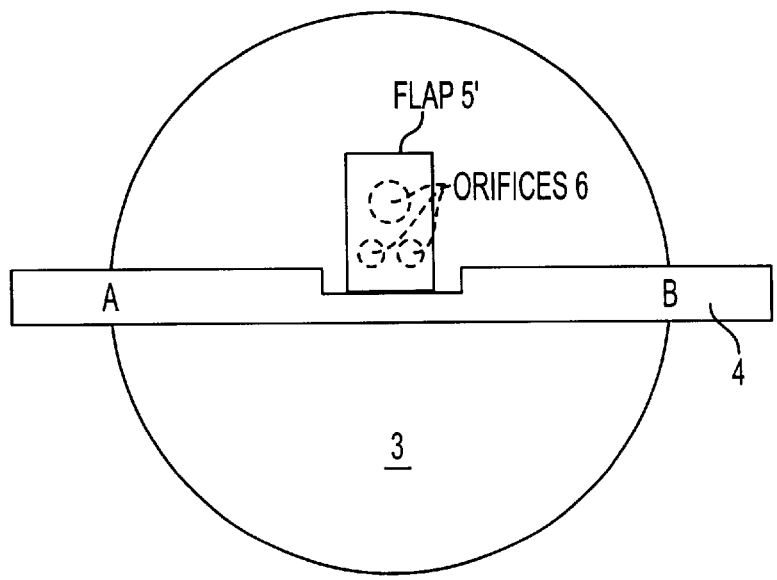
FIGS. 6 and 7 are elevational view of another shut-off devices according to the invention.
Figure 7:
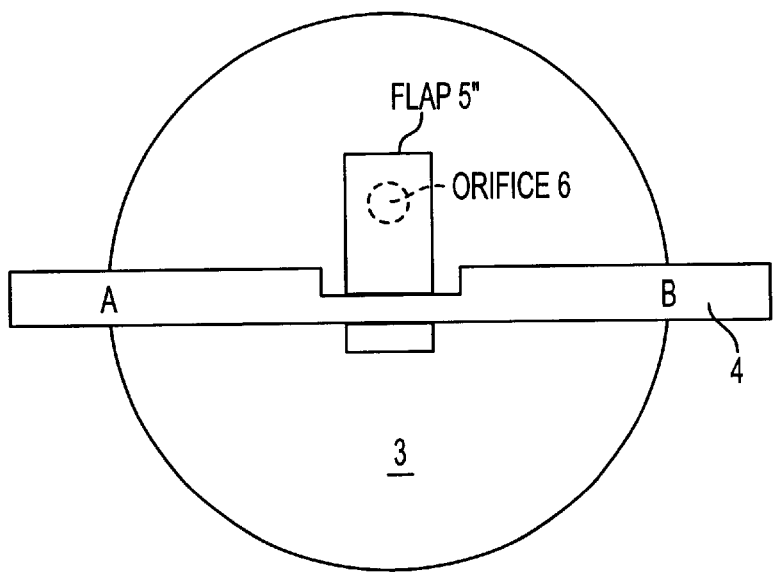

FIGS. 6 and 7 are elevational views of another embodiment of the shut-off device according to the invention. In both embodiments, there is a single flap (5) located in the middle of the spindle (i.e., equidistant from points A and B of the MSOM). As shown in FIG. 6, the flap (5') may be located entirely on one side of the spindle (4). Alternatively, the flap (5") may extend slightly toward the side of the MSOM (3) containing no orifice as shown in FIG. 7. In both embodiments, the orifice or orifices (6) is/are located entirely on one side of the spindle (4).

The advantages of having at least one orifice located entirely on one side of the spindle are:

(a) the absence of an air leak between one side of the main shut-off member and the other (because if the orifice extended on both sides of the MSOM, the flap which would be required to close the orifice would have to extend through main shut-off member, thus creating a problem of tightness around the spindle);

(b) the ease of obtaining this orifice (either by machining in the case of metal, or by injection molding in the case of plastic) which only goes through the flat surface of the main shut-off member, instead of at least partly through the housing of the spindle; and (c) the simplicity of the mechanical means required to close an orifice which is located only in one part of the main shut-off member.

According to the invention, the drive flap does not go through the main shut-off member as it is located entirely on one side of the plane formed by the main shut-off member. In a preferred embodiment, a single flap could close several orifices located within one side of the main shut-off member and still provide the advantage of tightness and thus, the absence of an air leak. Alternatively, according to the invention, there could be several flaps that close several orifices spaced within the same part or side of the main shut-off member. Since the flaps are located on the same side of the plane formed by the main shut-off member and divided by the spindle, there is no risk of leakage. However, flaps located on both sides of the plane formed by the main shut-off member and divided by the spindle create a problem of air tightness (or lack thereof) around the spindle.

A preferred embodiment according to the invention where the flap is located equidistant between the MSOM allows an increase in the size of the orifice. The advantage results since there is more room available for the orifice or hole located when the same is positioned near the middle of one side in the main shut-off member than close to the ends of the spindle. This embodiment allows a progressive flow regulation over a broader range of low flow rates. The various parts of the device are also easier to manufacture and to assemble, since there is more space available.

We claim:

1. A shut-off device for progressive regulation of the flow rate of fluid flowing along a longitudinal axis of a pipe, comprising:

a spindle having a longitudinal axis passing through the pipe, the longitudinal axis of the spindle being substantially perpendicular to the longitudinal axis of the pipe;

a substantially flat main shut-off member pivotably carried by the spindle so that the pipe can be closed or opened by the main shut-off member pivoting around the spindle, the spindle separating the main shut-off member so as to define a first part of the main shut-off member located on one side of the spindle, and a second part of the main shut-off member on the other side of the spindle;

said main shut-off member having at least one orifice located entirely in one part of the main shut-off member; and at least one flap fixedly attached to the spindle and acting mechanically on said main shut-off member in such a way as to turn said member about said spindle, said at least one flap being able to regulate the rate of flow of the fluid through said at least one orifice and to close the at least one orifice where the main shut-off member only begins to pivot about said spindle, from an initial closed position, when said at least one flap reaches a predetermined non-zero angular distance φ from said member thereby allowing the fluid to flow only through the at least one orifice until the main shut-off member begins to open.

2. The shut-off device according to claim 1, wherein there is one flap and one orifice.

3. The shut-off device according to claim 2, wherein said flap is located approximately in the middle of the spindle.

4. The shut-off device according to claim 1, wherein said at least one flap extends from one side of the spindle.

5. The shut-off device according to claim 1, wherein said at least one flap has two ends and is attached to said spindle so that one end extends slightly over the spindle toward a side without an orifice while the other end of the flap extends from the spindle over an orifice.

6. The shut-off device according to claim 1, wherein the pipe is of circular section and the main shut-off member is in the form of a disc.

7. The shut-off device according to claim 1, wherein the main shut-off member has return means so that, in the absence of any stress, said member shuts and closes off the pipe.

8. The shut-off device according to claim 7, wherein said return means keep the at least one flap separated from the main shut-off member in the absence of an external load.

9. The shut-off device according to claim 1, wherein the at least one flap is basically planar.

10. The shut-off device according to claim 1, wherein at least one flap has a protuberance that is essentially perpendicular to the flap, is directed towards the orifice and is able to engage in the latter.

11. The shut-off device according to claim 1, wherein the main shut-off member comprises a transverse hollow cylindrical housing for the spindle, said housing having an opening in the form of a slot, parallel to the spindle, through which the drive flap passes, said opening intercepting an angle perpendicular to the spindle which passes through the orifice, the design of the flap and the slot allowing said flap to pivot through a maximum angle $\phi$ relative to the main shut-off member.

12. The shut-off device according to claim 1, wherein there is one flap located entirely on one part of the main shut-of member and several orifices within the one part, said one flap closing the several orifices.

13. The shut-off device according to claim 1, wherein there are several flaps located entirely on the same part of the main shut-off member.

* * * * *